United States Patent
Koukios

(10) Patent No.: US 9,809,773 B2
(45) Date of Patent: *Nov. 7, 2017

(54) METHODOLOGY FOR THE REMOVAL OF INORGANIC COMPONENTS FROM URBAN WASTES, INDUSTRIAL WASTES AND SLUDGES FROM SEWAGE TREATMENT PLANTS

(75) Inventor: Emmanouil Koukios, Agia Paraskevi (GR)

(73) Assignee: Thermorefinery Technologies LLC, New York, NY (US)

( * ) Notice: Subject to any disclaimer, the term of this patent is extended or adjusted under 35 U.S.C. 154(b) by 622 days.

This patent is subject to a terminal disclaimer.

(21) Appl. No.: 13/394,140

(22) PCT Filed: Sep. 9, 2010

(86) PCT No.: PCT/EP2010/063262
§ 371 (c)(1),
(2), (4) Date: Mar. 2, 2012

(87) PCT Pub. No.: WO2011/029885
PCT Pub. Date: Mar. 17, 2011

(65) Prior Publication Data
US 2012/0160659 A1 Jun. 28, 2012

(30) Foreign Application Priority Data

Sep. 10, 2009 (GR) .................................. 090100486
Sep. 10, 2009 (GR) .................................. 090100487
Jan. 11, 2010 (GR) .................................. 100100012

(51) Int. Cl.
| | | |
|---|---|---|
| *C10B 53/00* | (2006.01) |
| *C10L 5/48* | (2006.01) |
| *C10B 57/14* | (2006.01) |
| *C10G 1/00* | (2006.01) |
| *C10G 1/02* | (2006.01) |
| *C10L 5/46* | (2006.01) |
| *C10L 9/08* | (2006.01) |
| *C10L 9/10* | (2006.01) |

(52) U.S. Cl.
CPC ................ *C10L 5/48* (2013.01); *C10B 53/00* (2013.01); *C10B 57/14* (2013.01); *C10G 1/00* (2013.01); *C10G 1/02* (2013.01); *C10L 5/46* (2013.01); *C10L 9/08* (2013.01); *C10L 9/083* (2013.01); *C10L 9/10* (2013.01); *C10G 2300/1003* (2013.01); *C10G 2300/201* (2013.01); *Y02E 50/10* (2013.01); *Y02E 50/14* (2013.01); *Y02E 50/15* (2013.01); *Y02E 50/30* (2013.01)

(58) Field of Classification Search
CPC ...... C10L 5/46; C10L 5/48; C10L 9/08; C10L 9/083; C10L 9/086; C10L 9/10; C10B 53/00; C10B 57/14; C10G 1/02; C10G 2300/1003; Y02E 50/10; Y02E 50/14; Y02E 50/15; Y02E 50/30
USPC .................... 201/3, 17, 25, 28; 44/552, 599; 210/634; 34/329, 330, 337–339, 34/348–350; 423/265, 267, 658.5
See application file for complete search history.

(56) References Cited

U.S. PATENT DOCUMENTS

| | | | | |
|---|---|---|---|---|
| 5,264,623 A | * | 11/1993 | Oehr et al. ..................... | 562/515 |
| 6,202,577 B1 | * | 3/2001 | Boguslaysky et al. ........ | 110/346 |
| 2009/0272027 A1 | * | 11/2009 | Ruiters ........................... | 44/505 |

* cited by examiner

Primary Examiner — Jonathan Miller
(74) Attorney, Agent, or Firm — Skokos Law Group, LLC; Soula Skokos

(57) ABSTRACT

A methodology for the removal of the harmful components of ash from urban/industrial wastes and sludges from the sewage treatment plants is invented. The harmful components are alkaline metals, chlorine, sulphur, zinc, lead, and chromium. They are removed before the thermochemical conversion and therefore the corrosion problems, scaling/deposition, ash agglomeration, dioxin and furan emissions, alkaline metal, chlorine, sulphur emissions are minimized if not diminished. The emissions of heavy metals such as zinc, lead, copper, and chromium are reduced. The removal is achieved with prepyrolysis/pregasification at 250-320° C. for 5 min to 2 h of urban/industrial wastes and sludges from the sewage treatment plants. Then the prepyrolyzed/pregasified sample is washed with a 0.5%-5% weight basis aqueous calcium acetate and/or magnesium acetate and/or aluminum acetate solution. These acetate salts can be mixed in a proportion of 0% to 100% to form an active salt which is used for the preparation of the aqueous solution.

8 Claims, No Drawings

METHODOLOGY FOR THE REMOVAL OF INORGANIC COMPONENTS FROM URBAN WASTES, INDUSTRIAL WASTES AND SLUDGES FROM SEWAGE TREATMENT PLANTS

The present invention refers to a methodology of removal of inorganic components such as potassium, sodium, chlorine, sulphur, zinc, lead, copper, and chromium from urban wastes, industrial wastes, and sludges from sewage treatment plants. This methodology can minimize/diminish corrosion and scaling/deposition problems, ash agglomeration, and gas emissions (potassium, sodium, chlorine, sulphur, heavy metals (Cu, Pb, Zn, Cr), dioxins, furans (PCDD, PCDF)) during thermochemical combustion, incineration, gasification, pyrolysis, of these urban/industrial wastes and sludges from sewage treatment plants with great economic and environmental benefits.

The secure, economic and environmentally beneficial treatment/neutralization/disposal of urban/industrial wastes as well as sewage treatment plant sludges is one of the most important problems in the world. The solutions applied such as dumping, and sanitary landfills have many problems e.g. land and underground water contamination, and emission of gases like methane which contribute to the greenhouse effect. In addition, the necessity to reduce the use of solid fuels and fuel oil in the production of energy in order to lower greenhouse gas emissions forces humankind to use many more renewable energy sources, among which urban/industrial wastes as well as sewage treatment plant sludges. According to the 1999/31/EU directive of the European Commission, up to 2010, the amount of biodegradable urban wastes disposed to the sanitary landfills should be reduced to the 75% (weight based) of the overall amount of wastes for 1995. Furthermore, it will be impossible to landfill wastes containing more than 5% biodegradable carbon. The thermochemical utilization of urban/industrial wastes as well as sewage treatment plant sludges is applied in many countries by thermochemical methods to produce primarily heat and electricity secondly. Incineration is a high cost and low energy efficiency solution of how to solve the problem of treatment/neutralization/disposal of urban/industrial wastes as well as sewage treatment plant sludges safely, economically and environmentally friendly. As a result the percentage of the waste of this origin treated with this technology is relatively low and it never exceeds 50-60%. Therefore, new technologies such as co-combustion of these wastes with solid fuels, gasification and pyrolysis have been developed. However, the same problems are present in these technologies too and consequently even these new technologies are not feasible.

The main cause of the problems which arise during the thermochemical incineration (ashing), combustion, gasification, and pyrolysis is the composition of the ash of these materials. These materials are either urban/industrial wastes or sewage treatment plant sludges and they contain both organic and inorganic components, or biodegradable materials (food residues, metals, glass, polymers, etc.). The same applies in the case of materials produced after partial treatment which mainly contain organic materials and some inorganic components, e.g. solid refuse fuel (SRF), or in the case of wastes containing only organics and biodegradables (food residues) and in some extent inorganics, e.g. refuse derived fuel (RDF). The ash of these urban/industrial wastes or sewage treatment plant sludges is very rich in metal alkalis, chlorine, sulphur, as well as heavy metals e.g. zinc, lead, copper, chromium, etc. and, therefore, the gases, liquids, and solids produced during the thermochemical conversion tend to react with each other or with any other inorganic material present, as well as with metal surfaces of the reactors. As a result corrosion, deposition/scaling, agglomeration, gas emissions are observed. These phenomena are responsible for financial losses, environmental problems, low conversion yields and therefore these technologies are not feasible unless are subsidized. Moreover, because of these problems these feedstocks are not used as raw materials for the production of chemicals, fuels and energy. What is more, dioxins (PCDD) and furans (PCDF) are produced from the chlorine in the polymers (e.g. polyvinylchloride—PVC). PCDD and PCDF are particularly harmful for human health and all kinds of life. The removal/destruction of these components can be achieved by costly processes/technologies of high risk When these problems are solved, this type of materials could be used (in mixtures solid or gas fuels or 100%) to produce energy/heat, liquid fuels, and chemicals with high economic and environmental benefits, particularly nowadays when the imported energy cost is rising, and greenhouse gases from solid fuels should be reduced.

The object of this invention is to remove the harmful components of the urban-industrial-sludge wastes as well as of the sludge of sewage treatment plants. These components are alkaline metals, chlorine, sulphur, as well as heavy metals such as zinc, lead, copper, and chromium. The harmful components are removed before thermochemical conversion and corrosion, scaling/deposition, ash agglomeration problems, and alkaline metal, chlorine, sulphur, heavy metal, dioxin and furan emissions are minimized/diminished. Another object of the invention is the production of low moisture material, low hygroscopicity, easily grindable, easily mixable with various other materials, easily fed in commercial boilers, easily pelletised at low energy consumption.

The object is achieved with a method for the removal of the harmful components of urban/industrial/sludge wastes as well as of the sludge of sewage treatment plants before the thermochemical conversion. The method has the following steps: i) heating of the ash or of the sludge, ii) washing of prepyrolyzed/pregasified raw materials with aqueous solution of acetate salt. This combination of two steps constitutes a hydrothermal treatment of urban/industrial wastes as well as of the sludge of sewage treatment plants.

Optional features that present further advantages when combined with the features of the independent claim 1 are included in the dependent claims.

Examples for the implementation of the invention are presented below:

In the beginning these wastes and sludges are heated anaerobically and/or with a small amount of oxygen. This amount is less than the 30% of that one required for stoichiometrical oxidation of these materials at temperatures from 200° C. to 320° C. The best and economically the most attractive results are achieved between 250° C. and 300° C. The treatment time is from 5 min to 2 h, while the best and the most cost effective results are achieved between 10 and 40 min. This treatment is called prepyrolysis/pregasification. During this treatment the organic structure of various urban/industrial wastes and sewage treatment plant sludges breaks and a material with higher fixed carbon, less volatile matter content is produced. A small amount of gases are also produced the main of them being water, carbon dioxide, carbon monoxide, as well as some light organic components which are burned in an internal combustion engine. The heat and exhaust gases produced from this engine are sued to cover the energy demand of prepyrolysis/pregasification. By this way the prepyrolysis/pregasification becomes energetically self sufficient. In addition, the whole chlorine from the organic structure of PVC is converted to chlorine gas and absorbed by inorganic materials such as calcium oxide and magnesium oxide thus producing safe and inert chloride salts and avoiding air emissions. The urban/industrial wastes and sewage plant sludges have a mass loss of 5% to 40% dry basis depending on the conditions and in the optimal case less than 20%. The heating value loss varies from 5% to 20% and in the optimal conditions approximately 7-10%.

Then the prepyrolysed/pregasified sample is washed with a 0.5%-5% w/w aqueous calcium acetate solution and/or magnesium acetate and/or aluminum acetate. These acetate salts can be mixed in a proportion of 0% to 100% to form an active salt which is used for the preparation of the aqueous solution. Otherwise, they can be used separately to prepare separate solutions for successive extractions with the same results. The proportions used and the use or not of successive extractions depend on the kind and the composition of the initial material as well as on the desired properties of treated material. Any kind tap water from a public water supply system, spring, etc. can be used for the preparation of aqueous solution. The liquid-to-solid ratio varies from 33 g/L to 600 g/L. The treatment temperature is from 13° C. till 95° C., and the treatment time is between 5 min and 24 h. Both liquid-to-solid ratio and temperature depend on the kind of urban/industrial wastes and of sewage treatment plant sludge.

After washing the material is dried in rotating dryers combining mechanical separation and drying. The material produced is free of chlorine and alkaline metals and contains significantly lower sulphur (35-55% of the initial content) and lower amount of heavy metals e.g. zinc, lead, copper, and chromium (50-75% of the initial content). Sulphur and heavy metal removal depend both on the kind of the initial raw material and ash composition.

The material produced after both treatments has the following characteristics: Less moisture, and hygroscopicity because of the destruction of hydrogen bonds during thermal treatment. Reduced grinding strength. It can easily pulverized to mix with other materials (carbon, biomass). Increased fixed carbon content and decreased volatile matter content 80%-90% of the initial heating value is maintained. Free of chlorine and alkaline metals. Substantial decrease of sulphur content and reduced amounts of heavy metals like zinc, lead, copper, an chromium.

As a result zero chlorine and alkaline metals are noticed and, therefore, corrosion problems, scaling/deposition, and agglomeration because of chlorine, alkaline metals are avoided. No dioxins and no furans are emitted and consequently there is no need to apply high cost technologies while the environment is protected. Substantially reduced or even zero sulphur emissions and decreased emissions of heavy metals. Air pollution is minimized. Corrosion, scaling/deposition, agglomeration because of sulphur and heavy metals from the ash of wastes and sludges is minimized. Calcium/magnesium acetate is recovered during drying. The results form the lab scale experiments showed that chlorine and alkaline metal emissions are always zero no matter what the treated materials are. Depending on the wastes and sludges and on the composition of their ash sulphur and heavy metal emissions can be zero or significantly reduced compared to the initial untreated material.

The following examples show the effect of the invention on two very important waste types.

EXAMPLE 1

Sludge from sewage treatment plant is prepyrolysed at 300° C. for 1 h and then is washed with an aqueous calcium acetate solution of 2% weight basis for 1 h at a solid-to-liquid ratio of 300 g/L under constant stirring and heating at 70° C. (liquid temperature) in a 2 L beaker on a hotplate. After treatment the sample is filtered and dried at 50° C. Table 1 shows the composition of the sludge from sewage treatment plant before and after the treatment, while table 2 depicts the composition of the ash of the sludge from sewage treatment plant before and after the treatment. Ash analysis showed that the pretreated material does not contain chlorine and alkaline metals at all, while the concentration of sulphur and heavy metals are considerably reduced compared to the initial material

EXAMPLE 2

A fraction from partially treated solid urban wastes of Athens is considered. This fraction contains mainly plastics/polymers, and some paper, leather, and inorganic materials. It is prepyrolysed at 300° C. for 1 h and then washed with an aqueous solution of 2% weight basis calcium for 1.5 h at 70° C. and a solid-to-liquid ratio 250 g/L under constant stirring within a 2 L beaker. Then it is filtered and dried at 50° C. Table 1 shows the composition of urban waste fraction before and after the treatments. Table 2 presents the composition of the ash from sewage treatment plant sludge before and after treatment. Ash analysis showed that the treated material does not contain chlorine and alkaline metals at all, while the concentration of sulphur and heavy metals are considerably reduced compared to the initial material.

TABLE 1

Analysis and characterization of a fraction of urban wastes and of sludge from sewage treatment plant

|  | Sludge from the plant | Pretreated sludge | Urban waste fraction | Treated fraction of urban wastes |
| --- | --- | --- | --- | --- |
| Proximate Analysis (% d.b.) |  |  |  |  |
| Moisture | 78 | 3.8 | 16.7 | 2.9 |
| Fixed carbon | 5.3 | 26.04 | 7.9 | 53.9 |
| Volatile matter | 56.33 | 30.8 | 80.8 | 32.9 |
| ash | 36.13 | 43.16 | 11.3 | 13.2 |
| Ultimate analysis (% d/b.) |  |  |  |  |
| Carbon | 42.64 | 44.26 | 47.6 | 69.09 |
| Hydrogen | 5.92 | 3.15 | 6.6 | 3.5 |
| Nitrogen | 3.16 | 2.23 | 0.2 | 0.15 |
| Sulphur | 0.80 | 0.5 | 0.3 | 0.16 |
| Oxygen | 11.35 | 6.7 | 38 | 13.9 |
| Heating value | 19.5 | 26.3 | 20.18 | 27.24 |

TABLE 2

Analysis and characterization of ash of urban wastes fraction and of sludge from sewage treatment plant

| Analysis (%) | Sludge from the plant | Pretreated sludge | Urban waste fraction | Treated fraction of urban wastes |
|---|---|---|---|---|
| $SiO_2$ | 34.5 | 43.08 | 37.8 | 45.69 |
| MgO | 4.0 | 4.9 | 2.9 | 3.2 |
| $Al_2O_3$ | 14.6 | 10.8 | 24.7 | 18.6 |
| CaO | 10.8 | 15.9 | 16.9 | 24.5 |
| $Fe_2O_3$ | 16.2 | 12.2 | 1.3 | 0.97 |
| $TiO_2$ | 1.4 | 1.7 | 4.6 | 3.4 |
| $P_2O_5$ | 15.9 | 10.45 | 0.8 | 0.4 |
| $K_2O$ | 2.1 | <0.1 | 1.7 | <0.1 |
| $Na_2O$ | 0.6 | <0.1 | 4.5 | <0.1 |
| $SO_3$ | 1.9 | 0.97 | 5.8 | 3.24 |
| Cl | 0.17 | <0.01 | 3.8 | <0.01 |
| ZnO | 300 ppm | 138 ppm | 330 ppm | 185 ppm |
| PbO | 28 ppm | 21 ppm | 52.4 ppm | 37.4 ppm |
| $Cr_2O_3$ | 110 ppm | 83 ppm | 140 ppm | 105.8 ppm |
| CuO | 283 ppm | 225 ppm | 80 ppm | 63.5 ppm |

With the described methodology the harmful components of urban/industrial wastes or sewage treatment plant sludge ash are removed. These components are alkaline metals, chlorine, sulphur, zinc, lead, copper, and chromium. Therefore, corrosion problems, scaling/deposition, ash agglomeration, dioxin and furan emissions, alkaline metals, chlorine, sulphur, and heavy metal emissions are minimized/diminished. The material produced has low moisture content, low hygroscopicity, it can be easily ground, and mixed with various other materials, it can be easily fed to commercial boilers to produce energy, it can be easily pelletised with or without other materials at various proportions and very low energy requirements.

Urban/industrial wastes and sludges from sewage treatment plants are prepyrolysed/pregasified at temperatures varying from 250 to 320° C. for 5 min to 2 h. The process is called prepyrolysis/pregasification. Then the prepyrolysed/pregasified sample is washed with a 0.5%-5% weight basis aqueous calcium acetate and/or magnesium acetate and/or aluminum acetate solution. These acetate salts can be mixed in a proportion of 0% to 100% to form an active salt which is used for the preparation of the aqueous solution. Otherwise, they can be used separately to prepare separate solutions for successive extractions with the same results. The proportions used and the use or not of successive extractions depend on the kind and on the composition of the initial material as well as on the desired properties of the material after treatment. Any kind tap water from a public water supply system, spring, etc. can be used for the preparation of aqueous solution. The solid-toliquid ratio is 33 g/L to 600 g/L, the temperature varies from 13° C. to 95° C., and treatment time is between 5 min to 24 h. Both liquid-to-solid ratio and temperature depend on the kind of urban/industrial wastes and of sewage treatment plant sludge. After washing the material is dried in rotating dryers combining mechanical separation and drying. The material produced is free of chlorine and alkaline metals and contains significantly lower sulphur (35-55% of the initial content) and lower amount of heavy metals e.g. zinc, lead, copper, and chromium (50-75% of the initial content).

The urban/industrial wastes and sludges from the sewage treatment plants can be prepyrolysed/pregasified at 250-320° C. for 5 min to 2 h. The prepyrolysed/pregasified sample is washed with a 0.5%-5% weight basis aqueous calcium acetate and/or magnesium acetate and/or aluminum acetate solution. These acetate salts can be mixed in a proportion of 0% to 100% to form an active salt which is used for the preparation of the aqueous solution. Otherwise, they can be used separately to prepare separate solutions for successive extractions with the same results. The proportions used and the use or not of successive extractions depend on the kind and on the composition of the initial material as well as on the desired properties of the material after treatment. Any kind tap water from a public water supply system, spring, etc. can be used for the preparation of aqueous solution at temperatures at solid-to-liquid ratio from 33 g/L to 600 g/L.

The prepyrolysed/pregasified sample is washed with a 0.5%-5% weight basis aqueous calcium acetate and/or magnesium acetate and/or aluminum acetate solution. These acetate salts can be mixed in a proportion of 0% to 100% to form an active salt which is used for the preparation of the aqueous solution. Otherwise, they can be used separately to prepare separate solutions for successive extractions with the same results. The proportions used and the use or not of successive extractions depend on the kind and on the composition of the initial material as well as on the desired properties of the material after treatment. Any kind tap water from a public water supply system, spring, etc. can be used for the preparation of aqueous solution at temperatures from 13° C. to 95° C.

Then the prepyrolysed/pregasified sample is washed with a 0.5%-5% weight basis aqueous calcium acetate and/or magnesium acetate and/or aluminum acetate solution. These acetate salts can be mixed in a proportion of 0% to 100% to form an active salt which is used for the preparation of the aqueous solution. Otherwise, they can be used separately to prepare separate solutions for successive extractions with the same results. The proportions used and the use or not of successive extractions depend on the kind and on the composition of the initial material as well as on the desired properties of the material after treatment. Any kind tap water from a public water supply system, spring, etc. can be used for the preparation of aqueous solution for a time period of 5 min to 24 h.

I hereby claim:

1. Method for the removal of the harmful components from at least one of urban wastes, industrial wastes, and sludges before the thermochemical conversion of the urban wastes, industrial wastes and sludges, the method consisting of the following steps:
   prepyrolysis of the wastes, wherein the prepyrolysis of the wastes occurs at temperatures between 200° C. and 320° C., for 5 min to 2 h; and
   washing of the prepyrolysis wastes with at least one aqueous solution comprising acetate salt, wherein the washing of the wastes occurs with an aqueous solution selected from the group consisting of calcium acetate, magnesium acetate, aluminum acetate, and combinations thereof at concentrations of 0.5% to 5% weight basis, at a solid-to liquid ratio 33 g/L to 600 g/L, temperature between 13° C. and 95° C., and treatment time from 5 min to 24 h.

2. Method according to claim 1, where the wastes are prepyrolysed at temperatures between 250 and 300° C.

3. Method according to claim 1, where the urban wastes or the industrial wastes or the sludges are prepyrolysed for 10 min to 40 min.

4. Method according to claim 1, where the prepyrolysed wastes are washed with an aqueous solution selected from the group consisting of calcium acetate, magnesium acetate, aluminum acetate, and combinations thereof at concentrations of 0.5% to 5% weight basis.

5. Method according to claim 1, where the acetate salts can be mixed in the washing solution in relative proportions of the mixed acetate salts.

6. Method according to claim 1, where the acetate salts within the washing solution are used successively for successive extractions to achieve the desirable result.

7. Method according to claim 1, where the prepyrolysed and washed wastes are dried with a combination of mechanical separation processes and of drying in rotational dryers.

8. Method according to claim 1, where the acetate salts are recovered during the drying process of the prepyrolysed and washed wastes and recycled to the process.

* * * * *